United States Patent
Ergen et al.

(10) Patent No.: US 10,243,837 B2
(45) Date of Patent: Mar. 26, 2019

(54) ENABLING SPLIT SESSIONS ACROSS HYBRID PUBLIC SAFETY AND LTE NETWORKS

(71) Applicant: ARGELA YAZILIM VE BILISIM TEKNOLOJILERI SAN. VE TIC. A.S., Istanbul (TR)

(72) Inventors: Mustafa Ergen, Istanbul (TR); Seyhan Civanlar, Istanbul (TR); Bulent Kaytaz, Istanbul (TR)

(73) Assignee: Argela Yazilim ve Bilisim Teknolojileri San. ve Tic. A.S. (TR)

( * ) Notice: Subject to any disclaimer, the term of this patent is extended or adjusted under 35 U.S.C. 154(b) by 0 days.

(21) Appl. No.: 15/418,502

(22) Filed: Jan. 27, 2017

(65) Prior Publication Data
US 2017/0353380 A1 Dec. 7, 2017

Related U.S. Application Data

(60) Provisional application No. 62/392,538, filed on Jun. 6, 2016.

(51) Int. Cl.
| | |
|---|---|
| *H04L 12/707* | (2013.01) |
| *H04W 40/02* | (2009.01) |
| *H04L 12/725* | (2013.01) |
| *H04L 12/741* | (2013.01) |
| *H04W 88/16* | (2009.01) |
| *H04W 88/06* | (2009.01) |

(52) U.S. Cl.
CPC ............ *H04L 45/24* (2013.01); *H04L 45/306* (2013.01); *H04L 45/74* (2013.01); *H04W 40/02* (2013.01); *H04W 88/06* (2013.01); *H04W 88/16* (2013.01)

(58) Field of Classification Search
CPC .............................. H04L 45/24; H04W 76/15
See application file for complete search history.

(56) References Cited

U.S. PATENT DOCUMENTS

| | | | |
|---|---|---|---|
| 2008/0056171 A1* | 3/2008 | Khayrallah | H04L 1/1812 370/314 |
| 2012/0147860 A1 | 6/2012 | Ramesh et al. | |
| 2012/0314948 A1 | 12/2012 | Raveendran et al. | |

(Continued)

OTHER PUBLICATIONS

M. Malboubi et al., "Multiple Description Image Coding: A New Efficient and Low Complexity Approach for Wireless Applications," 43rd Annual Allerton Conference on Communication, Control and Computing, Sep. 28-30, 2005, Monticello, IL, 7pgs.

(Continued)

*Primary Examiner* — Pao Sinkantarakorn
(74) *Attorney, Agent, or Firm* — IP Authority, LLC; Ramraj Soundararajan

(57) ABSTRACT

A special data splitter and data combiner is shown for low latency emergency and data intensive services so that multiple broadband and wireless networks can be utilized along with public safety networks. Any data session, multimedia or non-multimedia, is split into multiple packet streams with each stream having an identifier wherein some packet streams are sent via the secure public safety network and other streams are sent via other networks of varying characteristics and performance, and a combiner at the other end receiving multiple streams from different networks combines them into a single session.

17 Claims, 7 Drawing Sheets

(56) References Cited

U.S. PATENT DOCUMENTS

| | | |
|---|---|---|
| 2013/0051321 A1 | 2/2013 | Barbieri et al. |
| 2013/0107041 A1* | 5/2013 | Norem .................. H04N 5/225 348/143 |
| 2014/0201383 A1* | 7/2014 | Kuehnel ............. H04W 76/025 709/231 |

OTHER PUBLICATIONS

Y. Wang et al., "Multiple Description Coding Using Pairwise Correlating Transforms," IEEE Transactions on Image Processing, Feb. 2001, 10(3), pp. 351-366.

Nystrom et al., "Multiple Description Image Coding Using Regions of Interest," Proceedings of the 41st Asilomar Conference on Signals, Systems and Computers (ACSSC 2007), Nov. 4-7, 2007, pp. 925-929.

* cited by examiner

ENABLING SPLIT SESSIONS ACROSS HYBRID PUBLIC SAFETY AND LTE NETWORKS

RELATED APPLICATIONS

This application claims benefit of provisional application Ser. No. 62/392,538 filed Jun. 6, 2016.

BACKGROUND OF THE INVENTION

Field of Invention

The present invention relates to a system and method for efficiently transporting multimedia data services over multiple telecommunications networks, such as LTE, 4G and terrestrial public safety networks by splitting and combining data traffic according to characteristics of multimedia encoding methods used for video and image files and distributing the split traffic according to the performance, resilience and reliability of various networks. The system comprises a software system called splitter/combiner deployed on the access terminals and within the core network.

Discussion of Related Art

Mobile communications is a very large global industry. Revenues alone exceed one percent of the total global GDP. Mobile operators particularly in developed markets view data services as their primary source of growth for the upcoming years. The majority of mobile data traffic is currently served over third generation (3G) networks, using mainly a Universal Mobile Telecommunications System (UMTS) network based on the Global System for Mobile Communications (GSM) standards.

The increasing traffic demand is straining the capacity of 3G networks worldwide. Carriers have implemented various means to cope with this problem such as implementing data caps or moving to higher capacity 4G networks. However, it is anticipated that, even by taking such measures, the demand for wireless data services will continue to increase rapidly for the foreseeable future. The migration of data services to 4G networks is expected to somewhat improve the cost/revenue situation for the delivery of broadband data services. However, the much higher capacity of "Long Term Evolution" (LTE) networks will likely give rise to higher user expectations, which in turn will likely fuel even greater per user traffic volumes. Thus, cost effective means of maximizing the efficient usage of capacity and performance of LTE networks will be of particular value [see paper to Malboubi et al., "Multiple Description Image Coding: A New Efficient and Low Complexity Approach for Wireless Applications," 2005; see paper to Wang et al., "Multiple Description Coding Using Pairwise Correlating Transforms," 2001; see paper to Nystrom et al., "Multiple Description Image Coding Using Regions of Interest," 2007].

LTE is a fourth generation (4G) wireless network technology defined by standards issued by the Third Generation Partnership Project (3GPP). Frequency domain multiplexing provides multiple-access in LTE networks. In the downlink (or forward channel) direction the Orthogonal Frequency Domain Multiplexing (OFDM) is used, while in the uplink channel direction the Single Carrier Frequency Division Multiple Access (SC-FDMA) is used. LTE networks can utilize other non-3GPP or 3GPP networks to adjust rapid changes in demand distribution and other variable factors. In this way, networks can maximize data throughput, speed, performance, and capacity, while maintaining required coverage and reliability.

Nowadays, efficient public safety networks are needed not only to provide enough bandwidth when needed but also to reduce the latency in emergency conditions. For these reasons, governments, police force and organizations involved in public safety and security are devoting interest to transition from existing narrowband networks towards broadband. A prospective solution is the adaptation of LTE Advanced (4.5G) by meeting critical public safety networking requirements. The cost, timing and spectrum availability for the deployment of public safety networks are fairly demanding requirements.

Current public safety networks are based on narrowband wireless systems such as terrestrial trunked radio (TETRA) that focus on advanced security features and specific functionalities, but the support of high data rate services that are provided by broadband commercial mobile networks is still lagging behind. From the communications perspective, a public safety network is a communication network used by emergency services organizations, such as the police, firefighters and emergency medical services to prevent or respond to incidents that harm or endanger persons or property. Many municipalities are turning to mobile computing and other networked applications to improve the efficiency of their workforce, including public safety personnel and first responders. Consequently, public safety workers are increasingly being equipped with wireless laptops, handheld computers, push-to-talk devices and mobile video cameras to improve their efficiency, visibility, and ability to instantly collaborate with the central command, coworkers and other agencies. Video surveillance cameras and unattended sensors are becoming more important tools to extend the eyes and ears of public safety agencies. The data content security in a public safety network is another key requirement.

The U.S. based FirstNet is a typical public safety network. Using nationwide 700 MHz spectrum, FirstNet aims at putting an end to decades-long interoperability and communications challenges and help keep the US communities and emergency responders safer. US Congress allocated valuable spectrum and up to $7 billion in funding for the construction of the FirstNet network. To create a nationwide network, all 56 U.S. states and territories are provided with a radio access network that is connected to the FirstNet core network. To contain costs, FirstNet is tasked with leveraging existing telecommunications infrastructure and assets. This includes exploring public/private partnerships that can help support and accelerate the creation of this new advanced wireless network.

The need to access and share the vital new flow of data, voice, video and images is driving investments in a new kind of network: a broadband wireless mesh network based public safety network using WiMAX, and LTE, or a combination. These networks are metropolitan or regional in scope, can maintain connections with highly mobile workers, deliver large amounts of low-cost bandwidth with extremely high reliability, and support real-time video, voice and data. Several networking alternatives are being evaluated:

Modern Dedicated Public Safety network infrastructure.
Public Safety network over broadband commercial networks.
Hybrid solutions.

Dedicated networks have lower cost, rapid deployment and can be kept as state of the art. However, they may experience possible coverage holes and lack of features and redundancy. Also, traffic congestion and network downtime could be experienced. The usage of commercial networks, on the other hand, provides required resiliency, coverage, redundancy and higher availability. It has guaranteed QoS and full support for mission critical applications. While they have flexible coverage, the network cost will be higher and service deployment time will be longer. Hybrid solutions are the best of both worlds, but they require resource sharing policies and additional network infrastructure components when there are coverage holes. As a result, usage of various networks is a necessity and part of the 5G heterogeneous networking. The method and system presented here applies to a hybrid solution case, and further increases the granularity and efficiency of usage when there are at least two networks used for the transport of the same data session.

Embodiments of the present invention are an improvement over prior art systems and methods.

SUMMARY OF THE INVENTION

In one embodiment, the present invention provides a user terminal operable in a first wireless network and a second wireless network (e.g., the first wireless network may be a dedicated public safety network and the second wireless network may be a commercial wireless broadband network), the user terminal comprising: (a) a processor; (b) a storage; (c) a first network interface to communicate with the first wireless network; (d) a second network interface to communicate with the second wireless network; (e) the processor executing instructions in the storage to implement a resident umbrella layer, the resident umbrella layer measuring in real-time network capabilities associated with the two wireless networks via the first and second network interface, respectively, and (f) the processor executing instructions in the storage to implement a splitter to split each outgoing packet stream originated from the user terminal into at least two separate streams according to the measured network capabilities in (e), wherein the first network interface sends one stream to a first network base station associated with the first wireless network, and the second network interface sends another stream to a second network base station associated with the second wireless network. In an extended embodiment, the user terminal further implements a combiner to receive separate packet streams from the first and second base stations and combine them into a single stream, the single stream originating from another user terminal.

In another embodiment, the present invention provides a core network gateway comprising: (a) a processor; (b) a storage; (c) a first network interface to communicate with a first core network; (d) a second network interface to communicate with a second core network; (e) the processor executing instructions in the storage to implement a combiner: (1) receiving a first stream from the first core network over the first network interface receiving a second stream from the second core network over the second network interface, the first and second stream originating from a first user terminal, and (2) combining the first and second stream into a single stream for forwarding to a second user terminal. In an extended embodiment, the core network gateway further implements a splitter to receive a packet stream from the second user terminal and splitting it into a third and fourth stream for forwarding over the first and second network interface, respectively, to the first user terminal capable of receiving split packet streams.

In yet another embodiment, the present invention provides a system for communicating over at least a first wireless network and second wireless network, the first wireless network being a wireless dedicated public safety network and the second wireless network being a commercial wireless broadband network, the first wireless network associated with at least a first base station and the second wireless network associated with at least a second base station, the system comprises: (a) at least a first user terminal attached to the first and second base stations, the user terminal comprising: (1) a first network interface to communicate with the first wireless network and a second network interface to communicate with the second wireless network; (2) a resident umbrella layer measuring in real-time network capabilities associated with the first and second wireless networks using the first and second network interfaces, respectively, and (3) a splitter functionality to split each outgoing packet stream originated from the first user terminal into at least two separate streams according to the measured network capabilities, where the first and second network interfaces sending one stream to the first base station and the other stream to the second base station, (b) at least a second user terminal attached only to the first base station of the public safety network, and (c) a core network gateway comprising: (1) two network interfaces receiving one packet stream from a first core network and another packet stream from a second core network, and (2) a combiner functionality to receive the two packet streams from both core networks and combine them into a single stream generating the outgoing packet stream originated from the first terminal, and sending the combined stream to the second user terminal over the public safety network.

In yet another embodiment, the present invention provides a system for communicating over at least a first wireless network and second wireless network, the first wireless network being a wireless dedicated public safety network and the second wireless network being a commercial wireless broadband network, the first wireless network associated with at least a first base station and the second wireless network associated with at least a second base station, the system comprises: (a) at least a first user terminal attached to base station of said public safety network originating a data stream, (b) a core network gateway having a connection to core networks of both first and second networks, and a splitter functionality receiving the data stream from said first user terminal and split it into two streams according to capabilities of the first and second wireless networks, and (c) at least a second user terminal attached to base stations of the first and second networks receiving the two streams from the base stations having a combiner functionality to combine the two packet streams coming from the core network gateway into the originated data stream by the first user terminal.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

Figure 1:
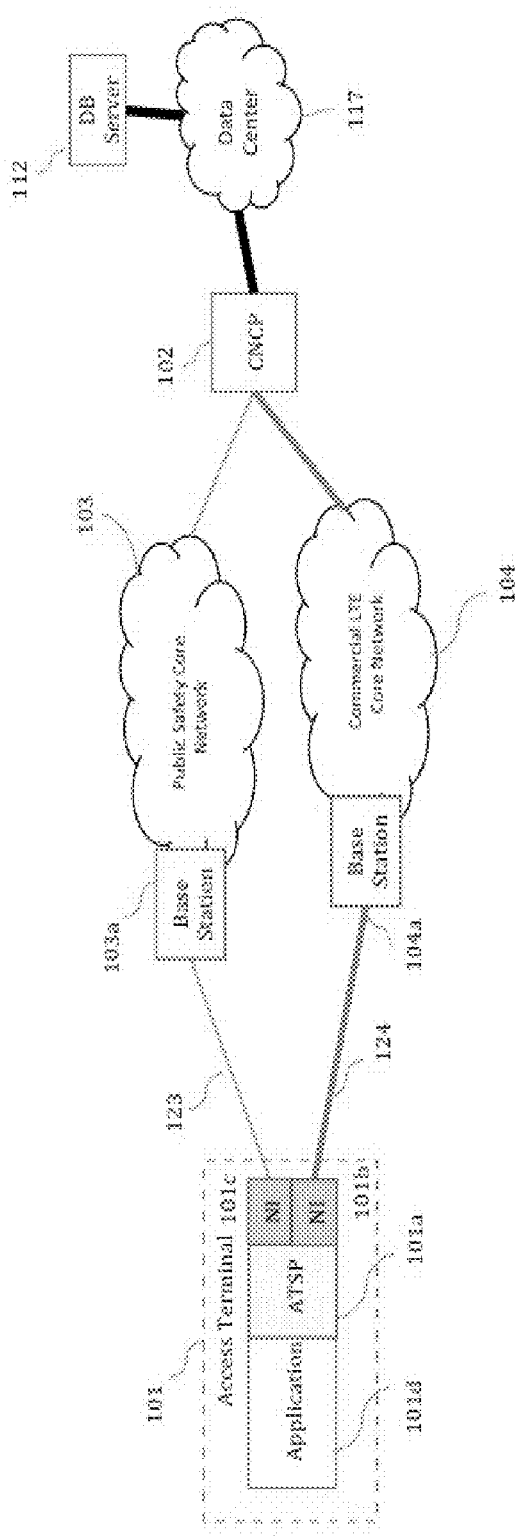
FIG. 1 illustrates a high level network diagram showing components of this invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

An electronic device (e.g., a base station, gateway, switch, or user terminal) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device such as a base station, a router, a gateway, a splitter/combiner per this invention are networking components including hardware and software that communicatively interconnect with other equipment of the network (e.g., other network devices, and end systems). Base stations provide the function of access data transmission over wireless (radio) links for wireless terminals such as telephones, computers, Internet of Things (IoT), etc., and provide the core network connectivity to other networking equipment such as gateways, routers and switches that exhibit multiple layer networking functions (e.g., routing, bridging, switching, Quality of Service, and/or subscriber and roaming management), and/or provide support for traffic coming from multiple application services (e.g., data, voice, and video).

Note while the illustrated examples in the specification discuss mainly video coded according to multi description coding (MDC), which is a coding technique that separates a digital video data stream into multiple data streams, each with a so called "different description", other coding methods that generate multiple digital data streams such as scalable video coding (SVC), or techniques according to H.264 and H.265 MPEG standards and even newer standards are equally applicable. With scalable video coding, a base layer and multiple enhancement layers of the video are generated as separate streams, and when combined they form the video. The base layer (crucial information) provides a minimal representation of the video while with each added enhancement layer (optional information) the video resolution is improved. However, an enhancement layer cannot be used to construct the image without the base layer. This type of decomposition provides an added security when the base layer is sent via a secure network such as the public safety network while only the enhancement layers are sent on commercial networks. Unless specified otherwise, the embodiments of the invention apply to any such encoded multimedia stream that can be separated into multiple streams wherein one of the stream components (a description or a base layer) can generate a meaningful enough representation of the data while additional stream components (additional descriptions or enhancement layers) when superimposed enhance the quality of the received multimedia data (e.g., video resolution). Such methods are available for jpeg-encoded images as well. The methods equally apply to unicast, multicast and broadcast type services. In what follows, hybrid network examples are shown with two networks only, while we should note that more than two networks are also viable.

The present invention is designed to solve the above-mentioned problems in a multiple access network setting. The proposed system has an Access Terminal Combiner & SPlitter (ATSP) implemented at the user terminal such as a wireless telephone or a wireless laptop and a Core Network Combiner & SPlitter (CNCP) implemented in a gateway in the core of the network. In the access network, there are a plurality of Base Stations of various different networks like a commercial public LTE network and a dedicated public safety network.

ATSP is a software that resides in the access terminal network stack within the Operating System (OS), and CNCP is a gateway (both hardware and software) located somewhere in the north of the core network. There may be at least one CNCP in the network. Both ATSP and CNCP have a reciprocal combiner and splitter mechanisms. Being a network component, CNCP may have an internal routing functionality as well. When ATSP divides up a data session into multiple sessions and distributes over multiple networks, CNCP performs the combining function if the sessions are coming from different base stations (i.e., the uplink direction). Alternatively, the CNCP can perform the splitting towards multiple networks' base stations (i.e., the downlink direction) in which case ATSP performs the combining function.

The base stations have wired and wireless interfaces. The wired interface is to connect the base station to the core data network. The wireless interface is to connect to the user terminals. Each base station has a fixed amount of wireless resource blocks and is required to fairly distribute this resource to all of the user terminals receiving service from that base station. It is envisioned that the offered services according to this patent will support a set of heterogeneous user terminals and networks.

As for prior art, US 20120147860 sends multiple versions of a multimedia packet to the base station, and, based on the radio channel and traffic characteristics, an appropriate version of the multimedia packet is sent to the destination mobile station at a given time. In this way, source transmission is improved according to instantaneous network conditions. This invention focuses on reliability rather than efficiency and low latency.

US 20120314948 utilizes the multi-description coding (MDC) for multimedia content with a plurality of forms of diversity. Based on motion or any other metric of interest, they fragment a source into one or more region of interest (ROI) portions and non-ROI portions. One or more of these portions can further be fragmented by sub-sampling the respective portions to generate a plurality of lower-resolution versions, e.g., with alternating groups of pixels in respective versions. Still further, one or more of these portions can be further fragmented by image frames, etc. with alternating frames in respective fragments. At least one ROI portion and lower-resolution versions may then be encoded into a plurality of descriptions and transmitted. Utilizing various combinations of ROI diversity, resolution diversity, and frame rate diversity, channel utilization and robustness for streaming multimedia content can be improved. This invention mainly claims better diversity by leveraging MDC.

US 20130051321 presents a disclosure that includes a wireless system to reduce quantization error due to codebook-based pre-coding matrix indicators (PMI) reported by pre-coding channel state information reference signals (CSI-RSs) via a base station. The base station varies the properties for a CSI-RS transmission in a known pattern and receives varying reports from the user terminal. The base station can reconstruct the PMI with improved accuracy by combining multiple consecutive descriptions. The invention mainly uses MDC for coding information.

A high-level network diagram with the systems of the invention is illustrated in FIG. 1. In a simple exemplary scenario, a mobile User Terminal 101, which is a video camera, sends a video recording to video database server 112. First, the video is encoded as two streams using an MDC or SVC video encoder, which is illustrated as application 101d. ATSP 101a resides in the User Terminal and separates these two streams and sends them towards the two network interfaces. One stream is sent towards base station 103a and the rest of the stream is sent towards base station 104a, via network interfaces 101c and 101d, respectively. Any data stream originated from 101 and sent to Base station 103a is routed towards CNCP 102 in the core of public safety network 103, and similarly base station 104a of the commercial LTE network sends the data stream it receives from user terminal 101 towards CNCP 102, attached to commercial LTE core network 104 according to an aspect of this invention. Commercial LTE network routers are configured with routing table entries such that packets originating from those user terminals of the public safety network are always forwarded towards the nearest CNCP 102 to the destination, which is attached to both networks and combines the streams received from different networks. CNCP 102 routes the video stream assembled from the two streams to video database 112 attached to a public safety data center 117.

The ATSP and CNCP have both the combiner and splitter functionalities, meaning, when ATSP is splitting, CNCP is combining, and when CNCP is splitting, ATSP is combining. In the exemplary scenario of FIG. 1, the ATSP is in a splitting role while the CNCP is in a combining role.

Figure 2:
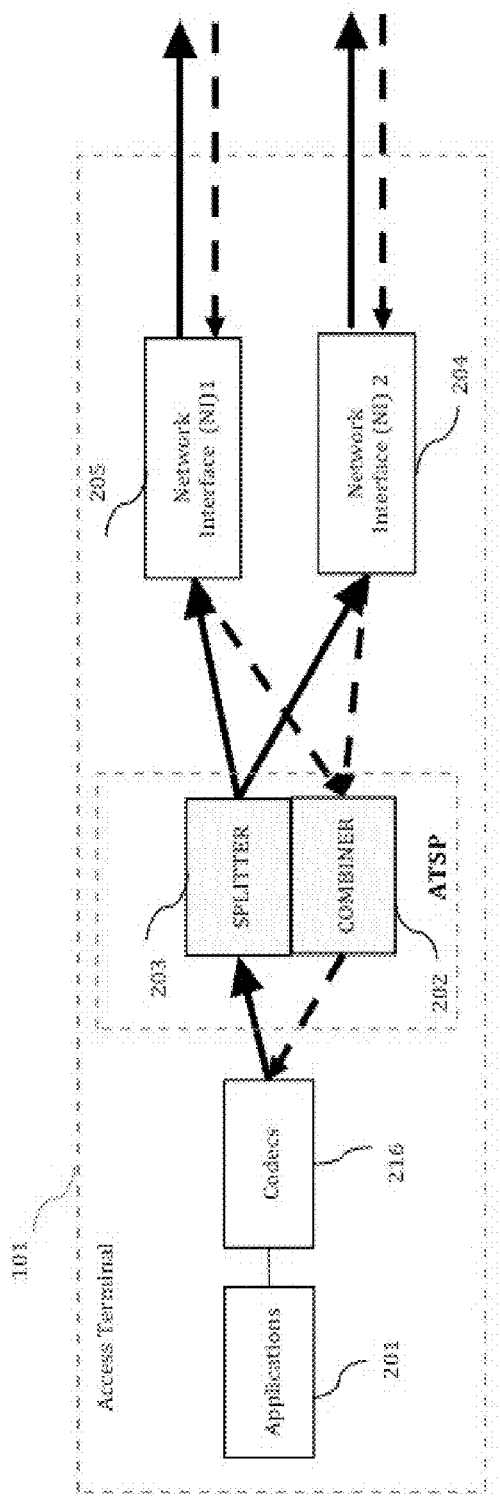
FIG. 2 describes the ATSP methods of combining and splitting.

FIG. 2 shows the mobile user terminal 101 in which the ATSP function is deployed. Example application 201 on the user terminal is a video encoder/decoder. ATSP is further blown up to show splitting function 203, and its dual, combining function 202. Depending on the direction of traffic (uplink or downlink) one of these functions is selected. Splitting 203 is selected if the traffic origination is the source application 201 (i.e., the application is in encoding mode) and the traffic is outgoing. The traffic is split into two (or more), and sent to network interfaces 205 and 204, respectively. The ATSP acts as combiner 202 for the incoming video traffic from network interfaces 204 and 205 when application 201 is the destination (i.e., the application is in decoding mode). The arrows are used to illustrate the direction of traffic.

Figure 3:
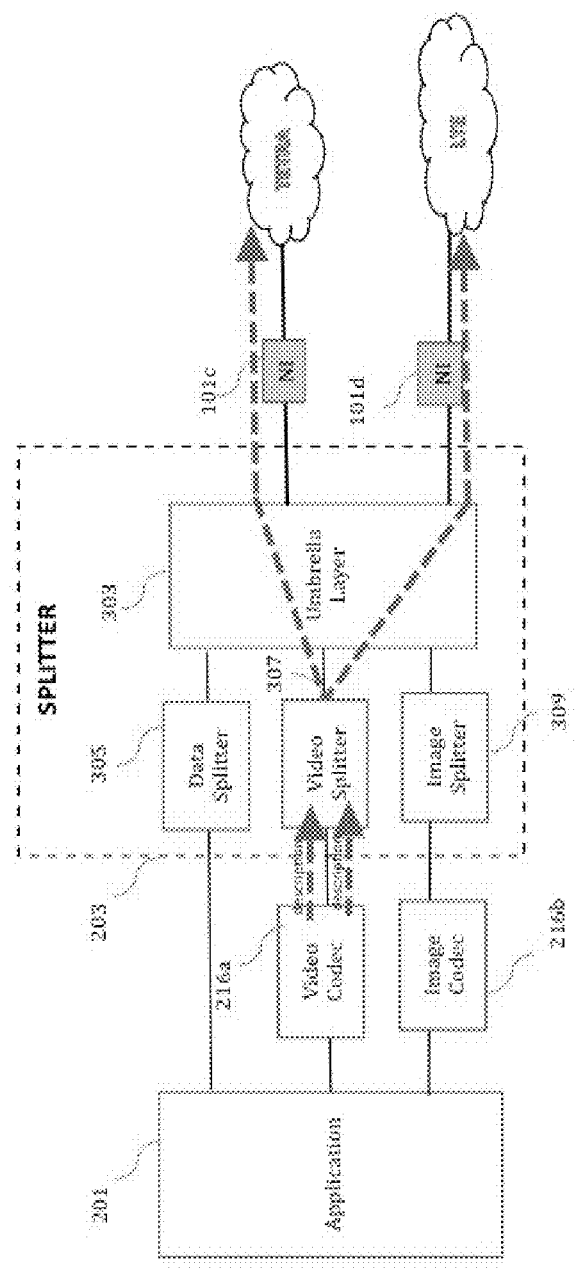
FIG. 3 illustrates a high-level block diagram of the splitter of the ATSP.

ATSP:

FIG. 3 illustrates Splitter 203 sub-function of ATSP shown in FIG. 2 in more detail. The splitter at the user terminal performs multimedia splitting, wherein the session has multimedia content such as video or image that may be further processed for splitting across multiple networks. For non-multimedia data, splitter provides a packet level data splitting. Note that audio is not split, as it is already narrowband therefore does not require any further processing to distribute across multiple networks unless there are security reasons to do so.

Umbrella Layer 303:

When a multimedia data session is started, application 201 sends this request to Umbrella Layer (UL) 303, which is resident in the user terminal and continuously monitors the wireless transport capabilities of its network connections via the TETRA and LTE networks by monitoring data traffic passing across Network Interfaces 101c and 101d, respectively. Umbrella Layer 303, for example, gathers statistics in terms of packet latency, packet loss and bandwidth on each network interface. This layer is required to handle applications that create sessions with different transport requirements, and dispatch traffic to different network interfaces. For instance, applications that require immediate image or video transmission have a different process than applications that send bulky data. The goal is to save time in getting critical multimedia information in the hands of first responders by leveraging parallel networks.

Image Splitter 309:

Image splitter 309 is attached to Image Codec 216b, which performs JPEG encoding of images. If the image is large and must be transmitted over both networks interfaces, which is determined by Umbrella Layer 303, then it has to be encoded accordingly. The image can be encoded with decimated versions using a JPEG coder with N/2 point Discrete Cosine Transform (DCT) so that two descriptions of the encoded image are generated; thereby, allowing transmission over two separate channels. When both descriptions exist, a high quality image can be reconstructed. On the other hand, if only the first description exists, it has acceptable quality. This encoder system does not introduce any extra work and the correlation between descriptions comes from the intrinsic correlation of spatial pixels.

Another possibility is to perform JPEG transformation more than twice to send over the two interfaces. The main description is sent through LTE and other descriptions, which require much less bandwidth, are sent through TETRA. This way, image quality can be increased over time as more descriptions arrive at the destination. Such encoding techniques are prior art as current networks are able to send high quality images by leveraging different networks.

Video Splitter 307:

Video Splitter 307 is attached to Video Codec 216a which uses multiple description coding (DCT) and/or scalable video coding (SVC) techniques and/or other similar coding methods. There are methods that do simple rate splitting or methods that calculate two simple parameters to characterize the smoothness and edge features of each block of an MPEG video frame. These two parameters are used as a measure of the perceptual tolerance of DCT blocks against visual distortion. They duplicate the key information such as motion vectors and some low-frequency DCT coefficients, and split the remaining DCT coefficients of prediction errors according to the calculated perceptual tolerance parameter. These are handled by our multiple description transmission system for MPEG video frames as well.

Umbrella Layer 303 communicates with the video encoder 216a to implement rate splitting as the default method when capacity, jitter and latency are adequate for both connections to transport descriptions (or layers) of the video. Video Splitter 307, in turn, bundles one or more of the descriptions (depending on the bandwidth available at each network connection) and sends them toward one of the Network Interfaces as illustrated in the figure. An added benefit of using SVC as opposed to MDC is the extra security. If the SVC base layer, which requires a low bandwidth, is transported over the secure TETRA network, the enhancement layers can be sent over a commercial public LTE network. However, one cannot recreate the video simply by capturing the enhancement layers, i.e., without using the base layer. Best features of the coding techniques can be utilized on a case-by-case basis.

Data Splitter 305:

When there is a non-multimedia data stream, Data Splitter 305 performs an optimized packet level splitting in order to utilize the best of both channels. From Umbrella Layer 303, Data Splitter 305 receives the necessary capacity and latency information from each network interface and splits the packets according to the received information. Hence, towards one network interface, a packet can have a different size and timing than another network interface. For instance, if one of the wireless network interfaces is TETRA, which is narrowband, supported packet size is smaller with reduced time interval between packets wherein LTE packets can be much larger. Accordingly, the Splitter performs a real-time statistical splitting to adaptively chop the packets to comply with different characteristics of various network interfaces collected by Umbrella Layer 303. If in certain cases, there could be a broadcast message that is originated in an access terminal to be distributed to all other access terminals. The data splitter utilizes both network interfaces to produce a broadcast message. It replicates packets with different packet sizes according to the information it receives from Umbrella Layer 303. Other mobile terminals receiving it from their dual interfaces reconstruct the information through the Combiner.

Figure 4:
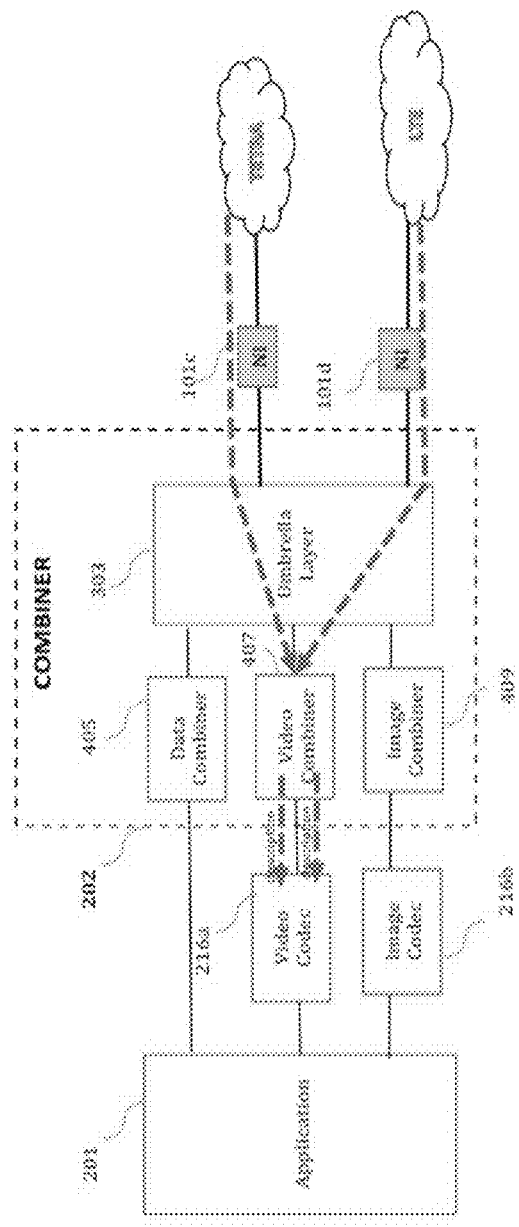
FIG. 4 illustrates a high-level block diagram of the combiner of the ATSP.

FIG. 4 illustrates Combiner 202 functionality of ATSP. It is essentially the reciprocal of the Splitting 203 functionality. The Combiner brings the packets into order based on packet headers. If any packet is missing, it initiates the recovery mechanism using TCP, RTP, RTCP, etc. In some cases, it may elect to transmit an erroneous packet to the destination to let destination ignite a retransmission.

Figure 5:
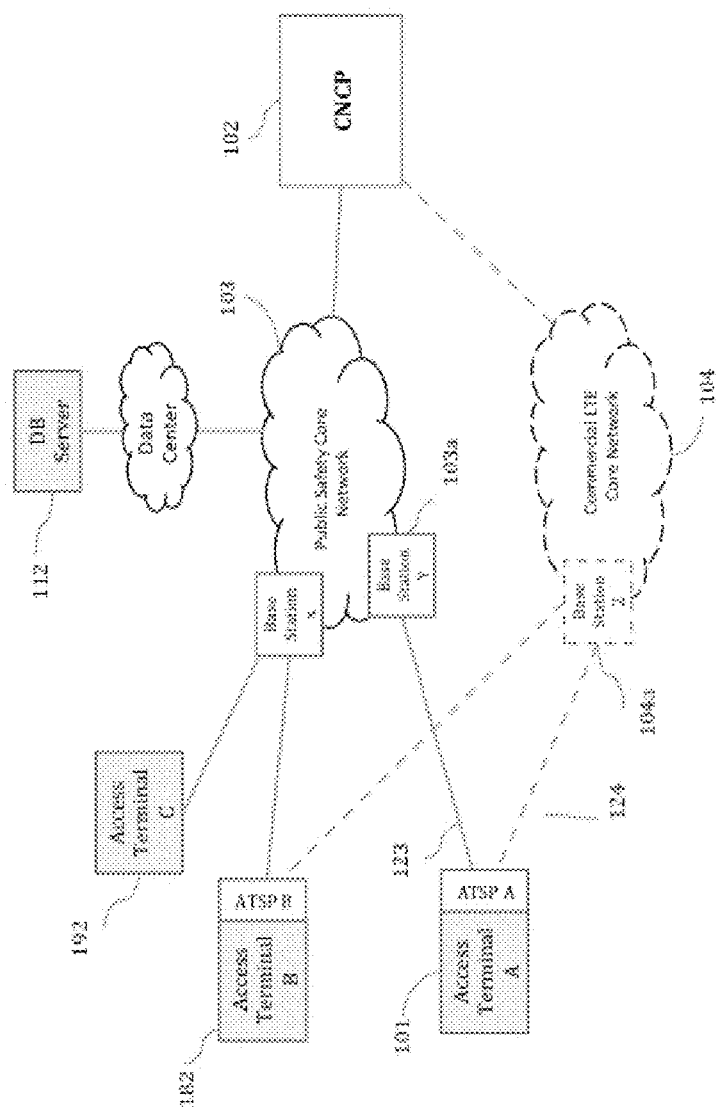
FIG. 5 illustrates a high-level network diagram with access terminals and CNCP.

In order to further clarify the division of splitting/combining tasks between the ATSP and CNCP, FIG. 5 illustrates a high-level example network diagram with Access Terminals A, B and C and database server 112, all attached to public safety network 103. These access terminals can be wireless laptops, wireless telephones, wireless sensors, etc. Note that Access Terminals B and C are attached to Base Station X, Access Terminal A is attached to Base Station Y, and DB Server 112 is attached to the core public safety network. The DB server is possibly a repository of all images and videos taken by access terminals and located in a secure data center attached to the core of public safety network 103. In a hybrid networking configuration, Access Terminals A and B are also attached to LTE network 104 via LTE base station Z, and therefore have ATSP functions for content splitting/combining at the access terminal. CNCP 102 is attached to core public safety network 103 and core LTE network 104.

If an access terminal or server is only attached to the public safety network, then the splitting function must be performed by the nearest CNCP within the core network. If an access terminal or server is attached to both networks, however, the splitting function is performed by the ASTP on the access side. The splitting and combining functions are therefore performed by the ATSP or the CNCP depending on the capabilities of the access terminal originating or terminating content as illustrated for various originating (from)-terminating (to) scenarios that correspond to the network configuration of FIG. 5:

TABLE 1

| From | To | Splitting Function | Combining Function |
| --- | --- | --- | --- |
| Access Terminal A | Access Terminal B | ATSP A | ATSP B |
| Access Terminal A | Access Terminal C | ATSP A | CNCP |
| Access Terminal A | DB Server 112 | ATSP A | CNCP |
| Access Terminal C | Access Terminal A | CNCP | ATSP A |
| DB Server 112 | Access Terminal C | — | — |

In summary, if the destination of a content originated from an access terminal hosting an ATSP that is simultaneously attached to the public safety network and the LTE network, and if the destination host is also simultaneously attached to the public safety network and the LTE network, then the combining function for the content can be performed by the destination's Combining Function 202 as illustrated in FIG. 4. However, if the destination host is attached only to the public safety network, then the combining must be performed within the core network by the CNCP right before sending the content to the destination. Similarly, if the content is originating from a host that is attached only to the public safety network, then at the core network, the CNCP can perform the splitting of the content so that it can be transmitted over two networks toward the destination access terminal that has attachment to both networks.

Figure 6:
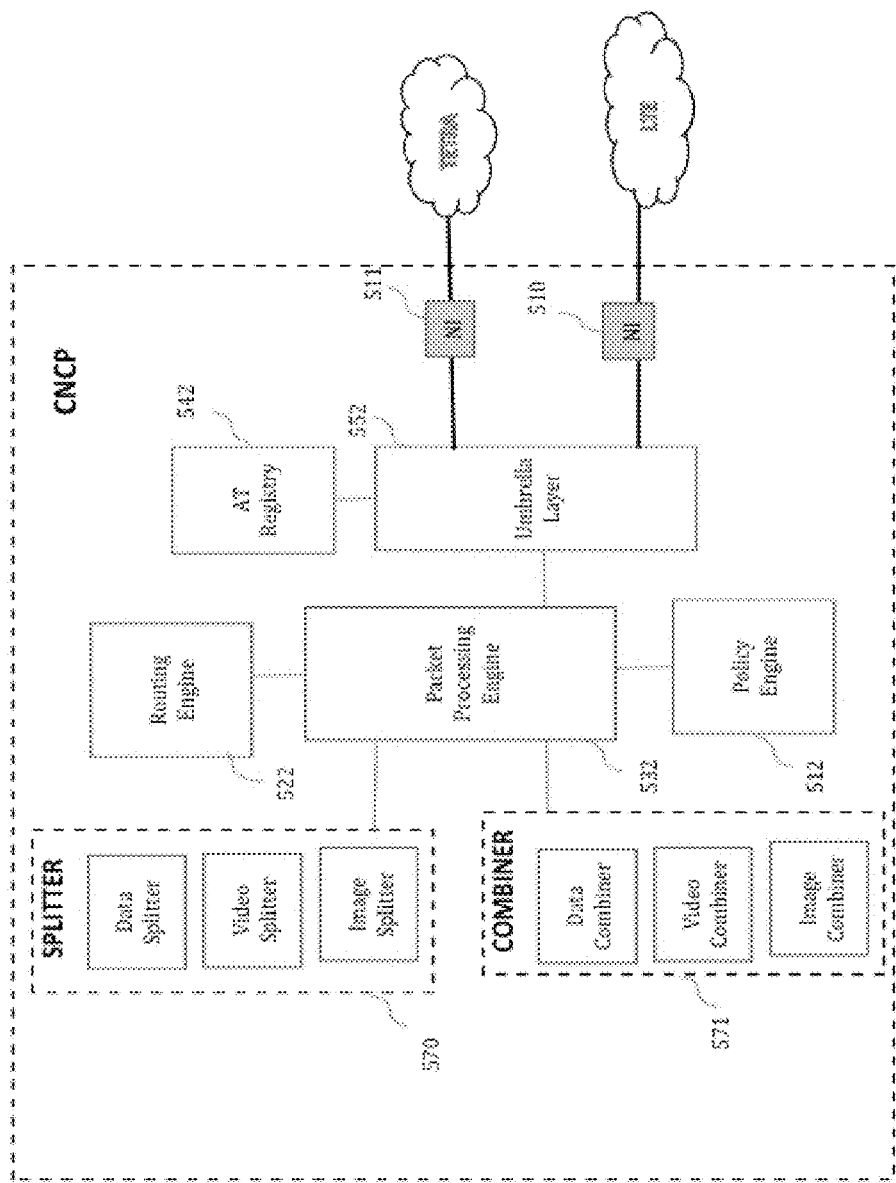
FIG. 6 illustrates a high-level block diagram on CNCP.

A high-level block diagram of the CNCP is shown in FIG. 6. CNCP is attached to the core of TETRA and LTE networks with Network Interfaces 511 and 510, respectively. Splitter 570 and Combiner 571 perform splitting and combining of video, image and other data traffic according to an aspect of this invention, as described in detail in the ATSP system. Umbrella Layer 552 gathers network related performance information from network interfaces 511 and 510 just as in the ATSP system. This information is used to determine how to dispatch split data streams onto different networks.

CNCP has AT Registry database 542 which keeps the information of all Access Terminals (such as IP addresses and MAC addresses) of the public safety network components, and if they have the ATSP function or not. The key function of the CNCP is Packet Processing Engine 532, which forwards each data packet to either Combiner 571 or Splitter 570 by simply inspecting the origination and destination IP addresses and checking them against a Routing Table that has proper forwarding instructions for data coming from or going to each Access Terminal that are at the AT Registry. For example, if a data packet is received from NI 511 originated from IP address of Access Terminal A and destined to IP address of Access Terminal C of FIG. 5, Packet Processing Engine 532 looks up its forwarding table and notices that AT A sends split data (because it has a resident ATSP function) but AT C has no combining function (because it is connected to public safety network only). Thus, it has an instruction to forward any packet from AT A towards Combiner 571, which in turn inspects the packet header information to identify if it is a video, image or data packet and identify which sub-function of Combiner 571 to send it to for combining. Combined data packets from AT A towards AT C are then routed back to the proper Network Interface via Routing Engine 522, which has the Routing Table for outgoing traffic. The CNCP optionally has Policy Engine 512, which contains rules for data processing priorities and policies for certain data streams. These policies feed into Packet Processing Engine 532. If the destination is another AT with ATSP function, then CNCP simply transmits the data packet as is to destination ATSP.

Figure 7:
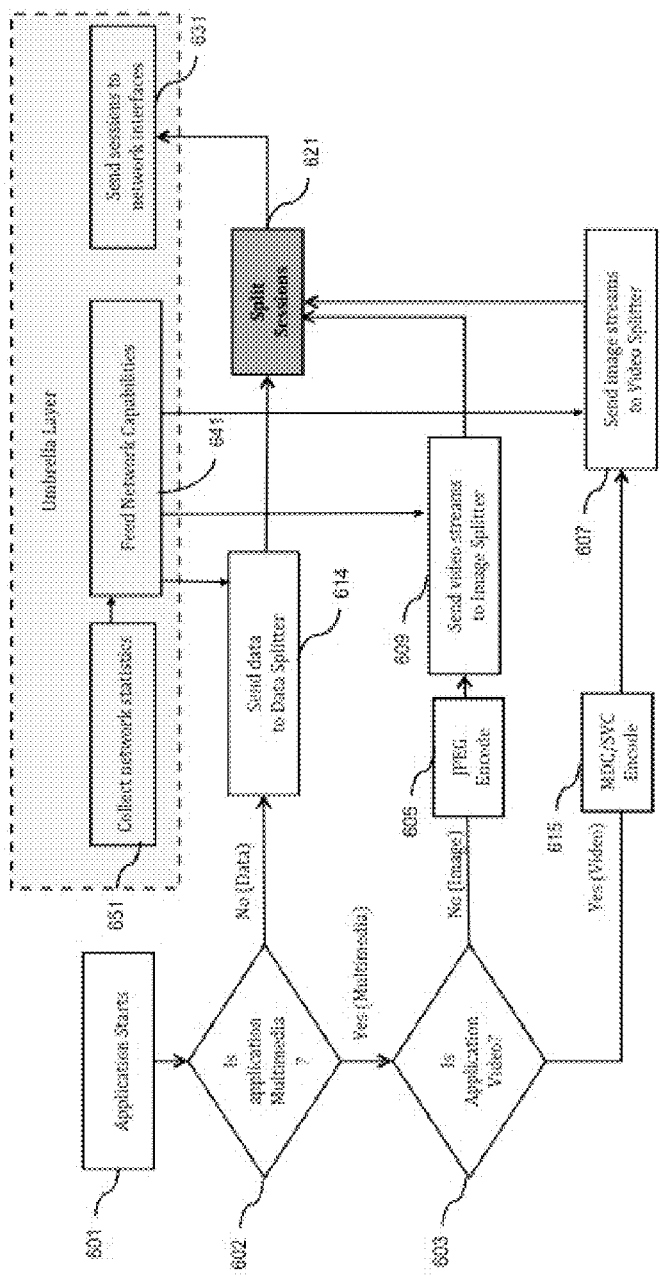
FIG. 7 illustrates a flow chart showing the splitting method within an ATSP.

FIG. 7 illustrates a high-level flow-chart of the splitting method within an ATSP or a CNCP. The process starts at step 601 when the application (local if it is an ATSP or remote if it is a CNCP) starts generating stream of packets. In step 602, the system checks to determine if the stream of packets is multimedia or not. If the application generates non-multimedia packets, the data is sent to data splitter in step 614. If the application generates multimedia data, the system checks to determine if the data is image or video in step 603. If the data is an image, then in step 605, the system sends the data to the JPEG codec to encode a split image according to an aspect of this invention. If the data is a video, then in step 615 the system sends the data to MDC/SVC codec to encode the video in split streams. Meanwhile, Umbrella Layer has been monitoring the capabilities of both TETRA and LTE networks simply by collecting data from the network interfaces in step 651. Capabilities, such as packet latency, BW and packet loss rate are processed and fed to the Splitters 614, 609 and 607. Subsequently, these splitters split and then bundle sessions according to the capabilities of the networks, and generate the sessions in step 621 ready for sending to the network interfaces. In step 631, the sessions are sent to the network interfaces and to the associated networks for transport.

Multimedia session splitting can be accomplished by decomposing files into crucial and less crucial parts such that crucial and vital data streams are sent to the public safety network, while other non-crucial streams are sent to non-safe networks and cannot be used without the vital blocks to reconstruct the multimedia content, thereby attaining high data security. The vital parts are sent over a low latency and highly reliable safe network and less crucial parts are sent over one or more high capacity but not highly reliable networks. The splitting is adaptable and can change over time according to topology and network conditions. Other embodiments of the splitting method of this invention are specifically for the uplink only or the downlink only using a core network based splitter and combiner, or for broadcast type communications flooded over the public safety network.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method has been shown in the above embodiments for the effective implementation of enabling split sessions across hybrid public safety and LTE networks. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A user terminal operable in a first wireless network and a second wireless network, the user terminal comprising:
   a. a processor;
   b. a storage;
   c. a first network interface to communicate with the first wireless network;
   d. a second network interface to communicate with the second wireless network;
   e. the processor executing instructions in the storage to implement a resident umbrella layer, the resident umbrella layer measuring in real-time network capabilities associated with the two wireless networks via the first and second network interface, respectively, and
   f. the processor executing instructions in the storage to implement a splitter to split each outgoing packet stream originated from the user terminal into at least two separate streams according to the measured network capabilities in (e),
   wherein the first wireless network is a dedicated public safety network and the second wireless network is a commercial wireless broadband network;
   wherein the first network interface sends one stream to a first network base station associated with the first wireless network, and the second network interface sends another stream to a second network base station associated with the second wireless network, and
   wherein the two separate streams comprise a first crucial data stream and a second non-crucial data streams, wherein the outgoing packet stream cannot be reconstructed without the first crucial data stream, and wherein the crucial data is routed towards the dedicated public safety network.

2. The user terminal of claim 1, further comprising the processor executing instructions in the storage to implement a combiner to receive separate packet streams from the first and second base stations and combine them into a single stream, the single stream originating from another user terminal.

3. The user terminal of claim 1, wherein the outgoing packet stream comprises any of the following: multimedia stream, non-multimedia stream, unicast stream, or broadcast stream.

4. The user terminal of claim 1, wherein the splitter comprises a plurality of splitters for splitting different stream types, the plurality of splitters comprising any of the following: a data splitter, a video splitter, or an image splitter.

5. The user terminal of claim 4, wherein the image splitter uses JPEG transformation to obtain multiple descriptions.

6. The user terminal of claim 4, wherein the video splitter uses multiple streams generated by any of the following coding methods: multi description coding, scalable video coding, or H.265 video coding.

7. The user terminal of claim 4, wherein the data splitter uses adjusted packet sizes and timing for each split packet stream according to available network bandwidth.

8. The user terminal of claim 1, wherein the measured capabilities are any of, or a combination of, the following: packet latency, packet jitter, packet loss, or bit rate of the wireless interfaces.

9. The user terminal of claim 1, wherein the user terminal is fortified with retransmission mechanisms for missing or erroneous packets.

10. A core network gateway comprising:
    a. a processor;
    b. a storage;
    c. a first network interface to communicate with a first core network wherein the first core network is a dedicated public safety network;
    d. a second network interface to communicate with a second core network wherein the second core network is a commercial wireless broadband network;
    e. the processor executing instructions in the storage to implement a combiner:
        i. receiving a first stream from the first core network over the first network interface and receiving a second stream from the second core network over the second network interface, the first and second stream originating from a first user terminal, and the first stream comprising a first crucial data stream and the second stream comprising a second non-crucial data stream
        ii. combining the first and second stream into a single stream for forwarding to a second user terminal, wherein combining the first and second stream into a single stream is not possible without the first crucial data stream, and wherein the crucial data is routed towards the dedicated public safety network.

11. The core network gateway of claim 10, further comprising the processor executing instructions in the storage to implement a splitter to receive a packet stream from the second user terminal and splitting it into a third and fourth stream for forwarding over the first and second network interface, respectively, to the first user terminal capable of receiving split packet streams.

12. The core network gateway of claim 10, wherein the single stream comprises any of the following: multimedia stream, non-multimedia stream, unicast stream, or broadcast stream.

13. The core network gateway of claim 10, wherein the combiner comprises a plurality of combiners for combining different stream types, the plurality of combiners comprising any of the following: a data combiner, a video combiner, or an image combiner.

14. The core network gateway of claim 13, wherein the image combiner uses JPEG transformation to obtain multiple descriptions.

15. The core network gateway of claim 13, wherein the video combiner uses multiple streams generated by any of the following coding methods: multi description coding, scalable video coding, or H.265 video coding.

16. The core network gateway of claim 13, wherein the data combiner uses adjusted packet sizes and timing for each split packet stream according to available network bandwidth.

17. A system for communicating over at least a first wireless network and second wireless network, the first wireless network being a wireless dedicated public safety network and the second wireless network being a commercial wireless broadband network, the first wireless network associated with at least a first base station and the second wireless network associated with at least a second base station, the system comprises:
    a. at least a first user terminal attached to the first and second base stations, the user terminal comprising:
        i. a first network interface to communicate with the first wireless network and a second network interface to communicate with the second wireless network;
        ii. a resident umbrella layer measuring in real-time network capabilities associated with the first and second wireless networks using the first and second network interfaces, respectively, and
        iii. a splitter functionality to split each outgoing packet stream originated from the first user terminal into at least two separate streams according to the measured network capabilities,
            where the first and second network interfaces sending one stream to the first base station and the other stream to the second base station,
    b. at least a second user terminal attached only to the first base station of the public safety network, and
    c. a core network gateway comprising:
        i. two network interfaces receiving one packet stream from a first core network and another packet stream from a second core network, and
        ii. a combiner functionality to receive the two packet streams from both core networks and combine them into a single stream generating the outgoing packet stream originated from the first terminal, and sending the combined stream to the second user terminal over the public safety network.

* * * * *